United States Patent [19]

Sharp

[11] Patent Number: 4,577,088

[45] Date of Patent: Mar. 18, 1986

[54] METHOD OF LASER BUTT WELDING

[75] Inventor: Charles M. Sharp, Landing, N.J.

[73] Assignee: SWS Inc., Landing, N.J.

[21] Appl. No.: 625,239

[22] Filed: Jun. 27, 1984

[51] Int. Cl.$^4$ .............................................. B23K 26/02
[52] U.S. Cl. ............................ 219/121 LD; 219/64;
219/121 ED; 219/121 LY
[58] Field of Search ................ 219/121 LC, 121 LD,
219/121 EC, 121 ED, 121 PJ, 121 PK, 121 LY,
64

[56] References Cited

U.S. PATENT DOCUMENTS

| | | | |
|---|---|---|---|
| 3,473,000 | 10/1969 | Siekman et al. | 219/121 LD |
| 3,969,604 | 7/1976 | Baardsen | 219/121 LM |
| 4,152,573 | 5/1979 | Saurin et al. | 219/121 L |
| 4,185,185 | 1/1980 | Adlam | 219/121 LM |
| 4,187,408 | 2/1980 | Heile | 219/121 LM |
| 4,354,090 | 10/1982 | Nilsen | 219/121 LC |
| 4,471,204 | 9/1984 | Takafuji et al. | 219/121 LD |

FOREIGN PATENT DOCUMENTS 73492  6/1980  Japan ............................ 219/121 LC

OTHER PUBLICATIONS

"Evaluating Pulsed-Laser Welding", Conference Digest, pp. 126 and 128, Machine Design.
"Arc Augmented Laser Processing of Materials", J. Appl. Phys., Nov. 1980, vol. 51, No. 11, pp. 5636–5641, by William M. Steen.

Primary Examiner—C. L. Albritton
Assistant Examiner—Alfred S. Keve
Attorney, Agent, or Firm—Antonelli, Terry & Wands

[57] ABSTRACT

A method of forming a continuous laser butt weld between two members is disclosed. The method comprises providing two members to be butt welded, positioning respective edges of the members in abutting contact with the two members being canted slightly with respect to one another so that the butt joint formed by the edges is open toward a first side of the member, with the edges contacting one another toward a second side of the members opposite the first side, and directing a high energy density laser beam at the butt joint from the first side of the members so that at least a portion of the laser beam extends into the open side of the butt joint to the edges, while urging the edges of the two members in the direction of the butt joint for butt welding the members.

20 Claims, 14 Drawing Figures

METHOD OF LASER BUTT WELDING

BACKGROUND AND SUMMARY OF THE INVENTION

The present invention relates to a method of forming a laser butt weld and, more particularly, to a method of progressively forming a laser butt weld between opposed, longitudinally extending edges to be welded, such as the opposite side edges of a sheet of material which has been formed into a tubular-shaped workpiece for making a can body or the like.

Progressively forming a laser butt weld along opposed edges of two members has recently been made possible by innovations such as that suggested by Saurin et al in U.S. Pat. No. 4,152,573 wherein the abutting edges to be welded are clamped relative to one another and then moved relative to a laser beam, and also that disclosed by Nilsen in U.S. Pat. No. 4,354,090 wherein a Z-bar guide apparatus is used for guiding the opposed edges to be welded into substantially abutting edge-to-edge relationship with one another for laser welding. With both of these known laser welding techniques, the edges to be welded are typically sheared edges of a material such as sheet metal, so that the edges extend essentially perpendicular to the plane of the material adjacent the edge. The adjacent edges are positioned in abutting relationship along essentially the entire thickness of the joint to form a closed butt joint which is welded by directing a laser beam at the weld joint from one side thereof.

It has been discovered that in forming such a butt joint between two members lying approximately in the same plane, there may be problems with inconsistent or irregular weld formation along the length of the members being welded, especially where welding is to be accomplished at a relatively high speed and with minimum heat input so as to reduce heat input related metallurgical problems and/or fluid flow problems known as slubbing. Fluctuations in the transfer efficiency of the laser energy to the edges to be welded along the length of the weld joint is one reason for this problem. More specifically, it has been found that the presence of burrs on one or more of the sheared edges to be welded contributes to this inconsistency. That is, when a material such as sheet metal, for example, is sheared, typically a burr is formed at the sheared edge, which extends outwardly from the plane of the sheet material in the direction of shearing. In the case where a burr extends outwardly from the side of a butt joint to be laser welded, and the laser beam approaches the joint on the side of the burr, at the instance of impingement the burr tends to scatter the laser energy and reduce the efficiency with which the laser energy can be transmitted to the edges for welding. Moreover, because the burrs are not of great mass as compared with the edges to be welded, they are vaporized in a short period of time after being contacted by the laser beam. This vaporization can further obstruct the transmission of laser energy to the edges to be welded and contribute to the inititation of a weld plasma in the area of the burr. The presence of the plasma may also further reduce the effectiveness of energy transmission to the edges for welding. Thus, the intermittent presence and often irregular configuration of burrs along the edges to be laser butt welded can result in incomplete weld penetration and weld formation, especially where a minimum heat input for welding abutting edges is employed. On the other hand, if the laser beam energy is increased so as to be sufficient to effect a weld even in the presence of burrs, in those areas having little or no burrs, an excess of heat input will exist for the formation of a sound weld. This will increase the size of the weld and weld heat affected zone, and also increase heat input related metallurgical problems and possibly slubbing. Thus, the presence of burrs can result in weld defects and also a reduction in the efficiency with which edges can be continuously laser butt welded.

The problem of course can be avoided by grinding sheared edges to be welded prior to welding to remove the burrs. However, this is undesirable because it adds an additional manufacturing step, and the consequent time and expense associated therewith, to the production process. Another possible solution is to ensure that any burrs on abutting edges extend outwardly from the weld joint on the side of the weld joint away from that upon which the laser beam is to initially impinge. Unfortunately, for many applications, this is not a practical solution since the burrs formed on opposite sides of a sheared piece of material will extend in opposite directions due to the construction and operation of the existing slitter or shearing apparatus. Forming a sheared piece of material into a tubular-shape for butt welding will then produce a weld joint with a burr protruding from both sides thereof.

An object of the present invention is to provide a method of forming a laser butt weld wherein the adverse effect of the presence of a burr on the side of the weld joint initially impinged by the laser beam, is avoided, so that more efficient, uniform welding of abutting edges can be accomplished at high speed, while minimizing heat input and heat input related problems such as slubbing.

A further object of the invention is to provide a method of progressively forming a laser butt weld between opposed abutting edges of two members, which method permits an increased welding speed with a given heat input and thereby a more efficient transfer of laser energy to the workpieces, so that a very narrow, uniform weld can be formed with a relatively small heat affected zone.

An additional object of the invention is to provide a method of the aforementioned type which permits keyhole welding of abutting edges to be accomplished at high speed and high efficiency to produce a weld having a relatively uniform cross section through the entire thickness of the members being joined.

These and other objects of the invention are attained by the method of the invention which comprises the steps of providing two members to be butt welded, positioning respective edges of the members in abutting contact with the two members being canted slightly with respect to one another so that the butt joint formed by the edges is open toward a first side of the members with the edges contacting one another toward a second side of said members opposite said first side, and effecting a butt weld at the butt joint by directing a high energy density laser beam at the butt joint while urging the edges of the two members in the direction of the butt joint, the laser beam being directed at the butt joint from the first side of the members so that at least a portion of the laser beam extends into the open side of the butt joint to the edges of the members.

According to a disclosed, preferred embodiment of the method, the butt weld between the two members is continuously formed along the length of the edges of the members by moving at least one of the laser beam and the members relative to the other in a direction along the butt joint to progressively weld the edges. In this embodiment, the two members are the opposite sides of a single piece of sheet material, and the step of providing the two members to be butt welded includes forming the piece of sheet material into a tubular-shaped workpiece having opposed longitudinally extending edges to be butt welded. The step of positioning the edges includes moving the tubular-shaped workpiece relative to a Z-bar guide apparatus with the edges being guided by the Z-bar guide apparatus into the abutting contact as described above. The method further includes the step of supporting the tubular-shaped workpiece by support means as it is moved relative to the Z-bar guide apparatus, the location of the support means being adjusted with respect to the Z-bar guide apparatus to effect the slight canting of the opposed sides of the workpiece with respect to one another. The tubular-shaped workpiece disclosed is generally cylindrical in cross section. It is supported by the support means relative to the Z-bar guide apparatus such that it has a slightly pear-shaped cross section with the edges to be welded located at the top thereof to thereby cant the opposed sides of the workpiece with respect to one another and open the joint on the outer side. This causes any burrs on that side of the joint to be pulled outwardly from the center of the joint so as to offer reduced or no interference to the incoming laser beam as compared to the conventional methods. Also, at least a portion of the approaching laser beam is free to pass directly into the open side of the butt joint to the edges for heating and melting the material thereof.

In the disclosed embodiments, the edges of the members to be welded are essentially straight sheared edges extending approximately perpendicular to the plane of the adjacent member. Burrs are present on the edges from the shearing operation. Thus, when the edges are positioned according to the invention, they make, as seen in a sectional view taken transverse to the edges, essentially point contact with one another at the second side of the members with the edges tapering away from each other in the direction toward the first side of the members.

Further, according to the invention, the high energy density laser beam preferably penetrates completely through the butt joint to effect keyhole welding of the edges. When this occurs, an additional step of the method includes providing a laser beam dump on the second side of the members to absorb the laser beam passing through the butt joint during the keyhole welding. This prevents damage to the inside of a tubular workpiece such as a can body or the like, for example, as well as collecting any debris expelled from the weld keyhole. The safety of the welding operators is also enhanced with the use of such a beam dump which prevents unwanted reflectance of the laser energy. Alternatively, the method may include providing a means to accurately reflect the laser beam which has passed through the butt joint back toward the joint to slow the cooling rate thereof.

When the laser beam penetrates completely through the butt joint to form a keyhole, molten edge material surrounds the keyhole. By urging the two members being welded in the direction of the butt joint during welding according to the method, the molten edges of the members are mashed together immediately behind the keyhole as the keyhole and laser beam move relative to the members in a direction along the butt joint.

A second embodiment of the invention comprises clamping the members to be welded in a welding jig with clamping means to position the respective edges in the described abutting contact.

These and other objects, features and advantages of the present invention will become more apparent from the following description when taken in connection with the accompanying drawings, which show, for purposes of illustration only, two embodiments in accordance with the present invention.

DESCRIPTION OF THE DISCLOSED EMBODIMENTS

Figures 1, 3, 5:
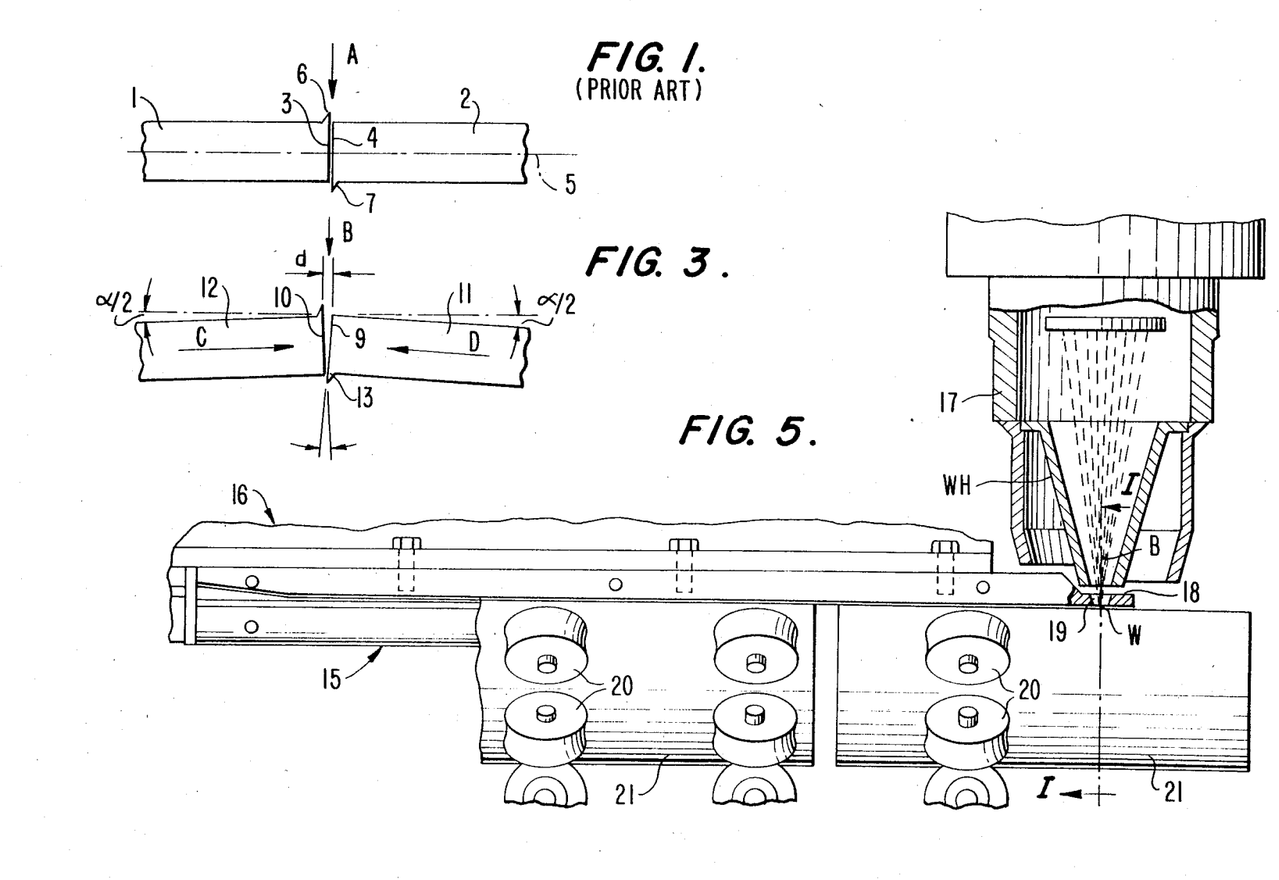
FIG. 1 is an enlarged side elevational view of the edges of two members arranged in a conventional butt joint for laser welding according to the prior art method.
FIG. 3 is an enlarged side elevational view of the ends of two members whose edges are to be laser butt welded according to the method of the present invention, and wherein the two members are canted slightly with respect to one another so that the butt joint formed by the edges to be welded is open toward a first side of the members, with the edges contacting one another toward a second side of the members opposite the first side.
FIG. 5 is a side elevational view, partially in cross-section, of an apparatus for laser butt welding opposed abutting edges of a longitudinally extending weld joint on the side of a tubular member such as a can body or the like according to the present invention.

Referring now to the drawings, FIG. 1 illustrates the opposed abutting edges of two members 1 and 2 to be laser butt welded according to the known method as disclosed in U.S. Pat. Nos. 4,152,573 and 4,354,090. The edges 3 and 4 of the members to be laser welded are essentially straight sheared edges which extend perpendicularly to the plane 5 of the respective members, and have burrs 6 and 7 remaining thereon from the shearing operation. The burr 6 on one of the members is on the top side of the joint as shown in FIG. 1, while the burr 7 on the other member extends downwardly from the joint. Of course, both burrs could be on the same side of the joint.

During laser welding of the joint in FIG. 1 according to the prior art method, a laser beam is directed to the butt joint in the direction of the arrow A, so as to impinge on the edges of the members on one side, in this case the top, of the joint. When the laser beam first strikes the burr 6 on the top side of the joint, the light of the laser beam is scattered somewhat due to the configuration of the burr, and, after a very short time, the burr will be heated and vaporized due to its small mass. As a result, the efficiency of transfer of the laser energy to the edges 3 and 4 of the members to be welded is adversely effected. That is, the burr initially scatters the incident laser energy, thereby making it unavailable for welding purposes, and the subsequent vaporization of the burr contributes to the formation of a weld plasma above the edges to be joined. The plasma and metal vapor at least partially obstruct the transmission of laser energy to the edges to be welded. The effect of the burr on the welding process is particularly pronounced where the laser energy and consequent heat input to the work during welding are to be minimized to reduce heat input related metallurgical problems, such as slubbing, which may occur during welding as in the high speed welding of thin materials for making can bodies and the like. Because of the varying size and configuration of the burrs on the edges to be joined, with a given laser beam energy focused at edges to be progressively welded, a satisfactory weld may be made at a first location along a weld joint, while incomplete penetration and other weld defects can occur at other locations along the joint. Thus, to ensure the formation of a full penetration weld along the entire length of a joint, the minimum laser beam energy that must be applied is that necessary for welding where the least efficient transfer of laser energy to the edges occurs. The locations along a weld joint where energy transmission is more efficient will then necessarily have an additional, undesired heat input during welding.

Figure 2:
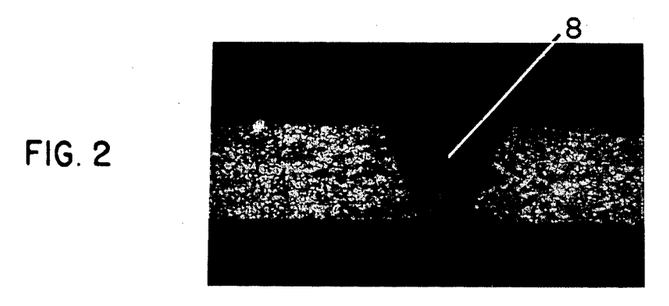
FIG. 2 is a cross-sectional view, 100X magnification, taken transverse to the welding direction, of a laser butt weld produced in members according to the prior art method.

A metallurgical cross section of a laser welded butt joint made according to the prior art method, with the edges arranged as shown in FIG. 1, and with minimal heat input for accomplishing keyhole welding, is shown in FIG. 2. The weld 8 between the adjacent edges has a wine-glass configuration with the widest section thereof occuring at the top of the joint, and the narrowest at the bottom. This occurs because of the relatively longer time for heat conduction on the side of the joint initially impinged by the laser beam. A non-uniform weld configuration of this type may be problemmatical in some instances because of the different metallurgical properties of the weld metal and the heat affected zone which can occur across the thickness of the welded members. This is the case in the fabrication of metal can bodies and the like, for example, where uniform properties are desired because the ends of the can bodies may have to be curled, necked-in, outwardly flanged, etc.

Figure 4:
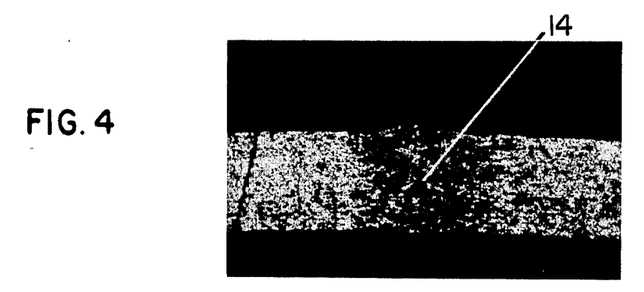
FIG. 4 is an enlarged cross-sectional view, 100X magnification, of a laser butt joint welded according to the invention, the view of the weldment taken transverse to the welding direction.

In order to reduce or avoid the adverse effects of burrs on the sheared edges to be welded, and also the non-uniform weld characteristics which occur when heat input for welding is minimized, according to the method of the invention and as depicted in FIG. 3, the opposed edges 9 and 10 of the members 11 and 12 to be butt welded are positioned in abutting contact with the two members 11 and 12 being canted slightly with respect to one another through a total angle $\alpha$ so that the butt joint formed by the edges is open toward a first, top side of the members with the edges contacting one another at 13 toward a second, bottom side of the members opposite the first side. A laser butt weld is then effected at the joint by directing a high energy density laser beam at the butt joint, while urging the edges of the two members in the direction of the butt joint. The laser beam is directed at the butt joint from the first, top side of the members, as shown by arrow B in FIG. 3, so that at least a portion of the laser beam extends into the open side of the butt joint to the edges 9 and 10. In this way, the burr on the top side of the joint is actually pulled back away from the center line of the joint to avoid or reduce its scattering effect and to reduce the effect of vaporization of the burr by the laser energy. Since at least a portion of the laser beam extends into the open side of the butt joint, heating takes place along all of the exposed edges to be welded from the instance of impingement, rather than only at the top side as in the prior art method as discussed above with respect to FIGS. 1 and 2. In this way, the method of the invention permits keyhole laser butt welding with minimum heat input, and, at the same time, with the attainment of relatively uniform weld characteristics across the thickness of the members being joined. A cross section of a weld made according to the present invention is illustrated in FIG. 4, wherein it is seen that the width of the weld 14 is relatively uniform across the entire thickness of the material.

With the joint open toward the upper side of the members 11 and 12 as shown in FIG. 3 and the opposed edges 9 and 10 making only essentially point contact at 13 with one another at the lower side of the members, a high energy density laser beam extending into the open side of the butt joint in the direction of arrow B can readily melt the opposed edges in the area of contact 13 and continue out the lower side of the joint, thereby establishing a keyhole for welding. Because of the spacing of the edges at the joint created by the slight canting of the members and the absence of additional filler material, it is necessary to urge the edges of the two members being welded in the direction of the butt joint, while the laser beam is being directed at the joint. The application of forces in the direction of the joint is schematically illustrated by the arrows C and D in FIG. 3.

This force should be sufficient to effectively mash the opposed molten edges of the members together subsequent to the laser keyholing through the joint.

In continuous butt welding along the length of two members to be joined according to the invention, the weld is progressively formed by positioning the respective edges of the members in the manner described, directing a high energy density laser beam at the butt joint to keyhole through the joint and moving at least one of the laser beam and the members relative to the other in a direction along the joint to progressively weld the edges while urging the two members together in the direction of the butt joint. The magnitude of the force urging the members toward the butt joint should be sufficient to mash the molten edges together without causing significant amounts of upset at the joint. The required force will vary depending upon the thickness of the members being joined, as will be readily understood by the skilled artisan.

According to a preferred embodiment of the method of the invention, the two members to be butt welded are the opposite sides of a single piece of sheet material, which is formed into a tubular-shaped workpiece having opposed longitudinally extending edges to be butt welded. The edges are positioned by moving the tubular-shaped workpiece relative to a Z-bar guide apparatus with the edges being guided by the Z-bar guide apparatus into the desired abutting contact. A known Z-bar guide apparatus and method of butt welding are disclosed in U.S. Pat. No. 4,354,090, referred to above, the disclosure of which is incorporated herein by reference. FIG. 5 of the drawings illustrates a portion of such an apparatus, wherein the Z-bar 15 extends along a can forming and welding machine 16, and generally terminates adjacent a laser welder 17. As shown in FIG. 5, the upper portions of the central guide member and the upper guide bar of the Z-bar have cantilevered nose portions 18 which extend outwardly beyond the discharge end of the Z-bar and beyond the welding point W. A conical opening 19 is provided through the nose portions 18. The opening is aligned with the welding head WH to permit an energy beam B to be focused on the edges of the sheet material passing therebelow. The nose portions 18 provide a vertical barrier which will further restrain the edges of the sheet material from relative vertical displacement, as discussed more fully hereinafter.

The material used to make cans with the apparatus of FIG. 5 ordinarily has a thickness within the range of 0.005 inch (0.127 mm) to 0.02 inch (0.50 mm), and, preferably, may be a 75 lb. tin plate which has a thickness of approximately 0.008 inch (0.203 mm), for example. The sheets of material used to make the can bodies are sheared by a conventional slitter arrangement and, therefore, are formed with burrs extending outwardly along their edges in the direction of shearing, as shown in FIGS. 1 and 3. The sheared material is passed through a roll former to the feed bar of the can forming machine and is urged into a cylindrical configuration by a plurality of spaced rollers, some of which are shown at 20 in FIGS. 5, 6A and 7A. Guides 44 are also employed in combination with the rollers as shown therein. There may be several sets of such rollers and guides disposed along the length of the machine, which cause a substantially flat sheet of material to be formed into a generally cylindrical configuration with the side edges being slideably received within the grooves of the feed bar of the forming machine.

In addition to the means for forming the sheet material, there is also some means provided for advancing the sheet material along the grooves of the forming machine, the Z-bar and through the welding station. In this regard, conventional chain-type conveyors, drive rollers, reciprocating pistons or push rods, or the like, may be used. However, for high speed welding, the apparatus disclosed in the commonly owned U.S. patent application Ser. No. 368,869, filed Apr. 15, 1982, now U.S. Pat. No. 4,497,995, is preferred. The disclosure of this related application is hereby incorporated by reference.

Figure 6A:
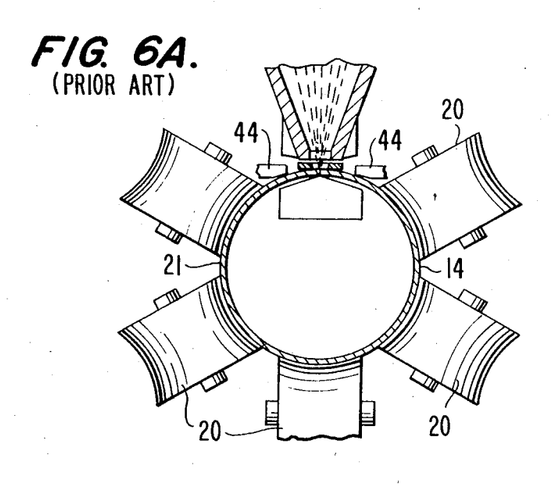
FIG. 6A is a cross-sectional view taken along the line I—I of the apparatus of FIG. 5 when used according to the prior art method.
Figure 6B:
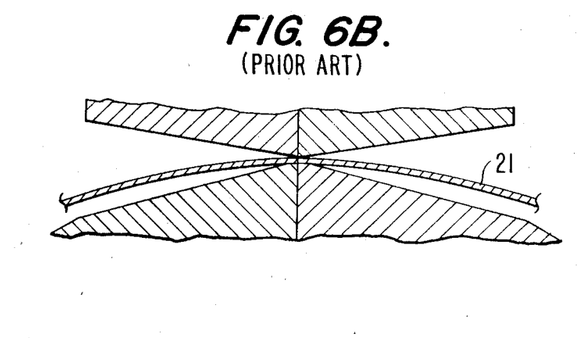
FIG. 6B is an enlarged cross-sectional view taken along the line II—II of the apparatus of FIG. 5, and illustrating the prior art method of bringing the edges into abutting contact for laser welding.
Figure 7A:
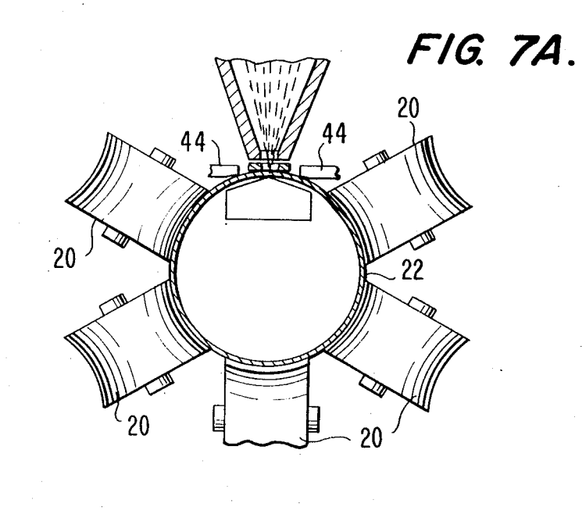
FIG. 7A is a cross-sectional view similar to FIG. 6A, but illustrating the apparatus in FIG. 5 in a modified condition for effecting a continuous laser butt welding according to the method of the present invention.
Figure 7B:
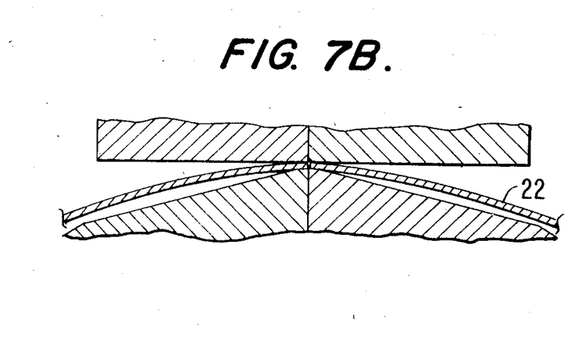
FIG. 7B is an enlarged, cross-sectional view similar to FIG. 6B, but illustrating the opposed abutting edges to be welded according to the method of the present invention, the edges being so arranged by the modified apparatus of FIG. 7A.

The Z-bar guide apparatus of FIG. 5 is operated according to the prior art method to advance and form the individual sheets of material 21 into a generally cylindrical configuration as shown in FIG. 6A, with the edges to be welded being in contact across the entire thickness of the material as shown in FIG. 6B, as previously discussed with reference to FIGS. 1 and 2. In order to perform the method of the invention, the apparatus of FIG. 5 is modified by lowering the support rollers 20 of the apparatus slightly and moving the upper support rollers and guides inwardly slightly, so that the configuration of the tubular workpiece 22 is somewhat pear-shaped, as illustrated in FIG. 7A. As a result of this, the edges to be welded are canted slightly with respect to one another, as shown in FIGS. 3 and 7B, so that the butt joint formed by the edges is open toward the outer side of the tubular workpiece with the edges contacting one another toward the inner side thereof.

Figure 8:
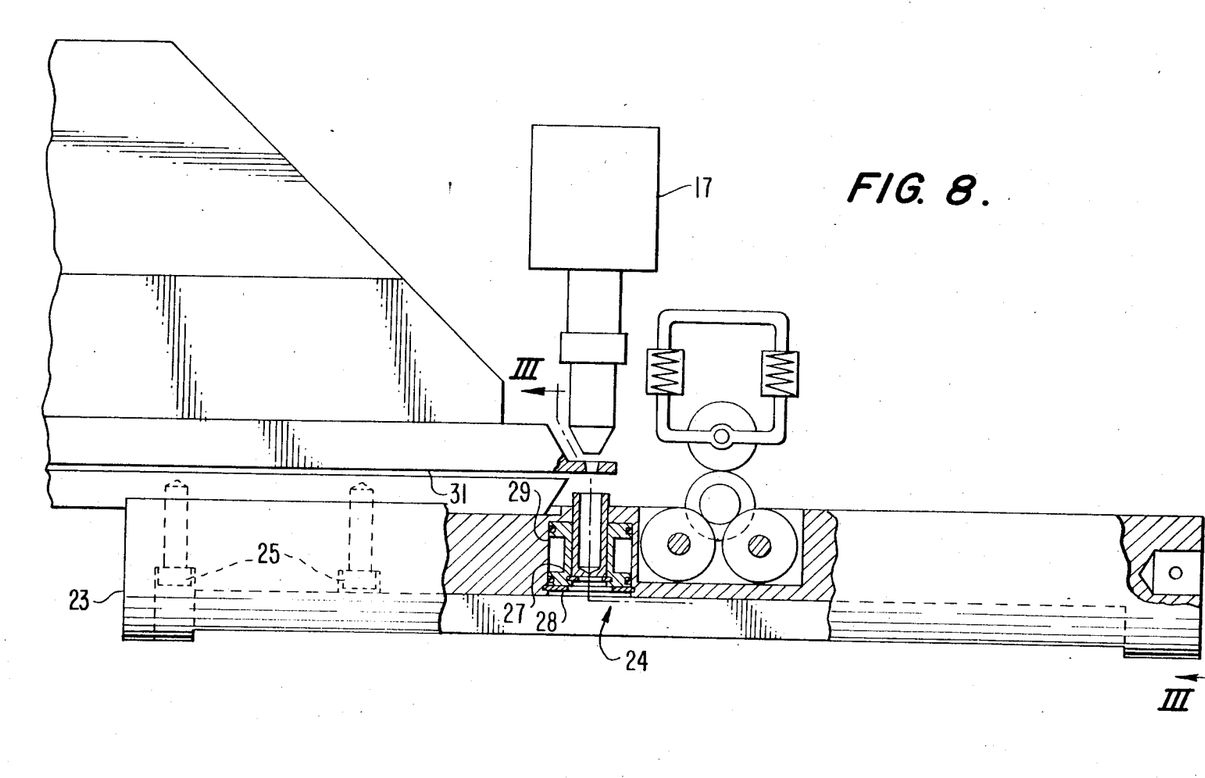
FIG. 8 is a side elevational view, partially in cross-section, of the Z-bar guide apparatus of FIG. 5, wherein a mandrel is secured to the lower surface of the Z-bar guide apparatus and carries a laser beam dump to absorb laser energy passing through the edges to be welded during keyhole welding.
Figure 9:
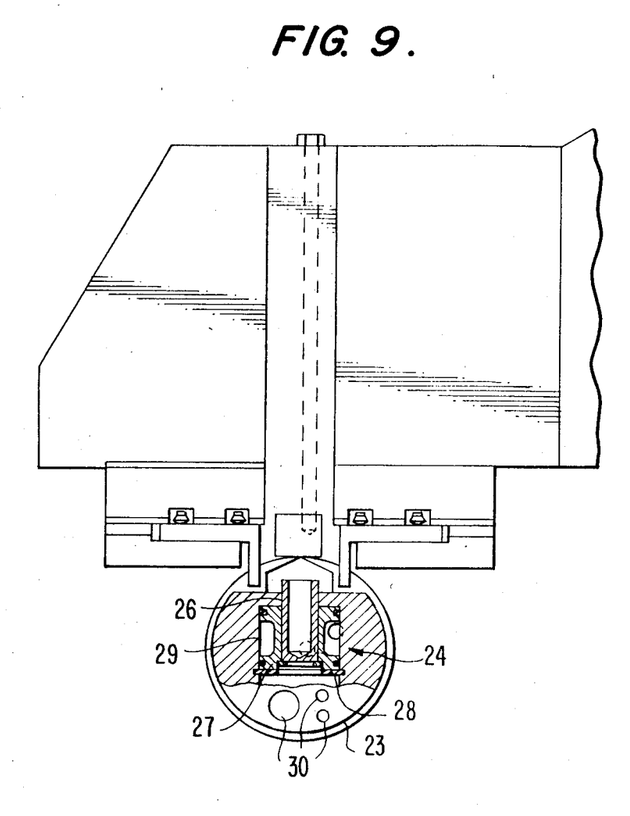
FIG. 9 is a cross-sectional view of the apparatus of FIG. 8, taken along the line III—III.

The method of the invention also preferably includes the additional step of providing a laser beam dump on the inside of the tubular workpiece to absorb the laser beam energy passing through the butt joint during welding. This prevents the inner side of the tubular workpiece from being damaged by laser energy during welding as well as collecting any debris expelled from the weld keyhole. Operator safety is also enchanced by using the beam dump. As shown in FIGS. 8 and 9, a mandrel 23 includes a laser beam dump 24 positioned adjacent the welding area for absorbing light from the laser beam B produced by the laser welder 17. The mandrel 23 is supported from the Z-bar 15 by means of connecting bolts 25, as illustrated in FIG. 8. The trailing portion of the mandrel extends beyond the end of the Z-bar guide in cantilever fashion. In this position, the mandrel 23 extends internally and in the direction of movement of the workpieces as they are advanced through the Z-bar guide and past the laser welder.

The laser beam dump 24 and mandrel 23 are positioned immediately below the laser welder 17 for absorbing light from a laser beam B produced by the laser welder, a 2 KW $CO_2$ gas laser, for example. The laser beam dump 24 includes a receptacle 26 in the form of a cup for receiving the light. The cup is provided with an opening through which the light can enter. The inside of the cup is colored a dark color, preferably black, for absorbing the light. While most of the laser energy is absorbed by the beam dump, the beam dump is not 100% efficient in absorption. According to a preferred form of the invention, the cup is formed of an aluminum alloy with the inside of the cup being anodized black. The cup could also be formed of other materials such as copper, for example.

The receptacle is cylindrical in shape and is removably positioned by means of a slide fit within a central opening in a cooling jacket 27 in the form of a spool positioned within the mandrel. The receptacle is supported within the spool on a snap ring 28, which is received within a groove in the wall of the cylindrical central opening of the spool. The spool closely surrounds the receptacle for good heat conductivity. Preferably, a thermal grease is provided between the receptacle and the cooling jacket to increase the efficiency of the heat transfer. The spool is preferably formed of copper for good heat conductivity and corrosion resistance, and is cylindrical in shape for positioning within a cylindrical hole formed in the mandrel. An annular coolant passage 29 is formed around the outer circumference of the spool. A coolant such as water is continuously supplied to the passage by means of inlet and outlet passages 30 extending through the mandrel to the passage, as illustrated in FIGS. 8 and 9. O-ring sealing members 31 on opposite sides of the passage effectively seal the spool in the cylindrical hole to contain the coolant. According to another form of the invention, the cooling jacket can be brazed in the hole. Further details of the laser beam dump and mandrel are set forth in the commonly assigned U.S. patent application Ser. No. 375,586, filed May 6, 1982, now U.S. Pat. No. 4,436,979, the disclosure of which is incorporated by reference.

Figure 11:
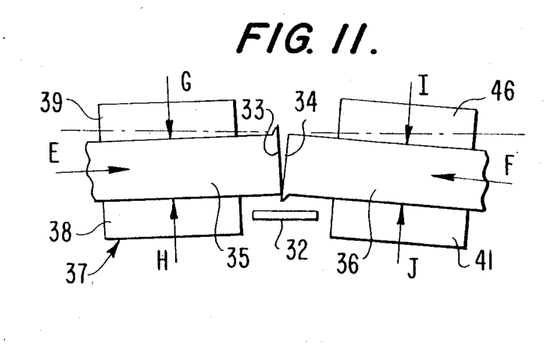
FIG. 11 is a view similar to FIG. 3, and schematically illustrating clamping means for clamping the respective edges in a welding jig with the two members being canted slightly with respect to one another for a laser welding according to the method of the invention.

Alternatively, according to another embodiment of the invention, the method includes the additional step of providing a means to reflect the laser beam which has penetrated the joint back toward the joint to perform pre- and postheating thereby slowing the cooling rate thereof. A reflecting means 32 for this purpose is schematically illustrated beneath the joint in FIG. 11. A highly reflective surface formed on a water-cooled copper member could be used as the reflecting means, for example. FIG. 11 also further illustrates a variation of the method of the invention wherein the respective edges 33 and 34 of the members 35 and 36 are positioned in abutting contact by clamping the members in a welding jig 37 with clamping means 38–41. Relative movement is then effected between the laser beam and the workpieces in the welding jig for progressively welding the edges along the longitudinal extent of the butt joint. Tangential forces indicated by arrows E and F are applied to the members during welding to urge the edges of the two members in the direction of the butt joint in the manner described above. Clamping forces applied by the clamping means 38–41 are shown by arrows G, H, I and J.

Figure 10:
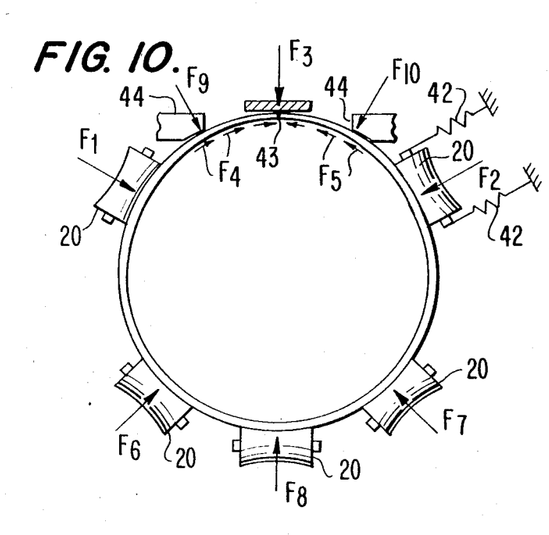
FIG. 10 is a schematic illustration of the forces on the tubular-shaped workpiece whose edges are being laser welded according to the method of the invention, the forces effectively urging the opposed abutting edges to be welded in the direction of the butt joint.

The forces applied to the generally cylindrical tubular workpiece 22 being welded according to the method of the invention with the apparatus of FIGS. 5, 7A and 7B are schematically illustrated in FIG. 10. The supporting rollers 20 urging the workpiece 22 into the generally cylindrical, albeit slightly pear-shaped, configuration are each biased by means of compression springs 42 in the direction of the workpiece, so that the forces F1, F2, F6, F7 and F8 are directed radially inwardly upon the tubular workpiece. The guides 44 also interact with the workpiece with forces F9 and F10. The stationary nose portions 18 extending from the Z-bar on both sides of the weld area are in continuous contact with the upper surface of the ends of the members before and after welding to provide a vertical barrier restraining the edges of the sheet material from relative vertical displacement. The radially directed force F3 schematically shown in FIG. 10 depicts the function of the nose portions in this regard. Absent the nose portions 18 and guides 44, the free ends of the members to be welded would tend to rise upwardly because of the resilient nature of the workpiece material. The radial forces upon the tubular workpiece induce tangential forces F4 and F5 urging the edges of the two members in the direction of the butt joint 43. Thus, when keyholing of the laser beam through the joint takes place with the melting and displacement of the lower contacting portions of the edges, the opposed molten edges are moved closer to one another and actually mashed together in response to the forces F4 and F5. More particularly, the molten edges are mashed together behind the keyhole as the laser beam is moved along the butt joint to progressively weld the tubular body.

Figure 12:
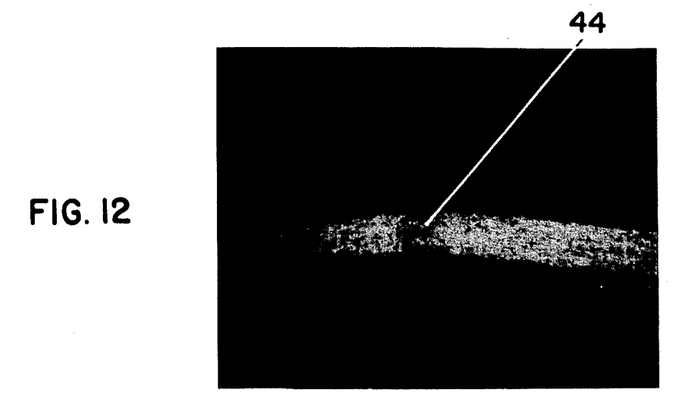
FIG. 12 is an enlarged metallurgical section taken transverse to a weld made according to the method of the invention.

In an actual application of the method of the invention, generally cylindrical can bodies were laser butt welded using the apparatus of FIGS. 5, 7A and 7B. A steel sheet material having a thickness of 0.008 inch was used to form the can bodies. The sheared edges of the opposite sides of a tubular-shaped workpiece were positioned in abutting contact using the Z-bar guide apparatus 15. The two ends of the workpiece were canted slightly with respect to one another at an angle $\alpha$ of 17° so that the butt joint formed by the sheared edges was open toward the outer side of the tubular workpiece a distance $d = 0.002$ inch with the edges contacting one another toward the inner side of the tubular workpiece. A laser beam, from a 2 KW $CO_2$ gas laser, having an energy density of at least $10^6$ watts/cm$^2$ and a beam width of 0.003–0.004 inch at the workpiece was directed at the butt joint to accomplish progressive, keyhole welding along the length of the joint as the can body was moved at a speed of 30 m/min. beneath the laser welder 17. The resulting weld was well formed throughout the length of the weld joint and, in addition, had a relatively uniform cross-sectional configuration on top and bottom, notwithstanding the presence of burrs on the sheared edges. A metallurgical cross-sectional view of the weld 44 is shown in FIG. 12. As will be readily apparent to the skilled artisan, other thicknesses of material and other shapes of workpieces could be butt welded with the method of the invention. The angle $\alpha$ at which the opposed edges are canted could be varied, and preferably is no more than would allow the maximum beam diameter to pass through the open joint regardless of the thickness of the material being welded. This pulls any burrs from the centerline of the joint and allows sufficient laser energy to enter the open joint and impinge directly on the opposed edges.

Thus, the method of the invention is particularly advantageous in avoiding the aforementioned problems which occur as a result of the presence of burrs on the edges of sheared workpieces, and, in addition, offers the additional advantage of enhanced efficiency of welding because the weld plasma is not solely formed on the top of the workpieces being welded during the initial impingement of the laser beam, but rather can form toward the opposing side of the members as well to attain a more efficient, uniform heat distribution. This results in a reduction in heat input related metallurgical problems such as slubbing and damage to the base material in the heat affected zones adjacent the weld material. The method is also advantageous in that it aids the keyholing of the laser beam through the weld joint and results in welds having more uniform characteristics or shape. Strongly reflecting surfaces of the material also need not be removed or masked for laser welding, since reflected laser energy will tend to be trapped within the open joint. The method of the invention is therefore an aid to high speed laser butt welding, wherein the abutting edges may be welded at speeds of 15 to 75 meters per minute, for example.

While I have shown and described only two embodiments in accordance with the present invention, it is understood that the same is not limited thereto, but is susceptible to numerous changes and modifications as known to those skilled in the art. For example, it is envisioned that the method of the invention is applicable to other high energy density welding processes wherein a beam of energy is employed to effect fusion of the workpieces. Thus, the method of the invention would have utility with an electron beam as the high energy density welding beam, for example. The material welded in the disclosed example is a thin sheet metal, but the method of the invention is also applicable to welding thicker material and also non-metallic materials, such as plastic members, for example. Several laser beams could also be employed from the same or opposite sides of the weld joint for welding the members. Therefore, I do not wish to be limited to the details shown and described herein, but intend to cover all such changes and modifications as are encompassed by the scope of the appended claims.

I claim:

1. A method of forming a laser butt weld comprising the steps of providing two members to be butt welded, positioning respective longitudinally extending edges of said members to be butt welded in abutting contact with the two members being canted slightly with respect to one another so that the butt joint formed by said abutting edges is open toward a first side of members in a direction transverse to the direction in which said edges longitudinally extend and with said abutting edges of said butt joint contacting one another toward a second side of said members opposite said first side, and directing at least one high energy density laser beam at said butt joint from said first side of said members in a direction transverse to the direction in which said edges longitudinally extend so that at least a portion of said laser beam extends into the open side of said butt joint to said edges while urging said edges of the two members in the direction of said butt joint for butt welding said members.

2. A method according to claim 1, wherein said butt weld is continuously formed along the length of said edges by moving at least one of said laser beam and said members relative to the other in a direction along said butt joint to progressively weld said edges.

3. A method according to claim 2, wherein said two members are the opposite sides of a single piece of material which is formed into a tubular-shaped workpiece having opposed longitudinally extending edges to be butt welded.

4. A method according to claim 3, wherein said step of positioning said edges includes moving said tubular-shaped workpiece relative to a guide apparatus, said edges being guided by said guide apparatus into said abutting contact.

5. A method according to claim 4, wherein said tubular-shaped workpiece is supported by support means as it is moved relative to said guide apparatus, the location of said support means being adjusted with respect to said guide apparatus to effect said slight canting of the opposed sides of the workpiece with respect to one another.

6. A method according to claim 5, wherein the tubular-shaped workpiece is generally cylindrical in cross section, said workpiece being supported by said support means relative to said guide apparatus such that the workpiece has a slightly pear-shaped cross section with said edges being at the top thereof to thereby cant the opposed sides of the workpiece with respect to one another and open said joint on the outer side of said workpiece.

7. A method according to claim 1, wherein said high energy density laser beam penetrates completely through said butt joint during said welding to effect keyhole welding of said edges.

8. A method according to claim 7, wherein said method includes the additional step of providing a laser beam dump on the second side of said members to absorb the laser beam passing through said butt joint during said welding.

9. A method according to claim 7, wherein said method includes the additional step of providing a means to reflect the laser beam adjacent the second side of said members to reflect the laser beam passing through said butt joint back towards said joint to preheat and/or postheat the members thereby slowing the cooling rate thereof.

10. A method according to claim 1, wherein the edges of said members are essentially straight sheared edges with burrs remaining thereon from the shearing operation, whereby the positioned edges, as seen in a sectional view taken transverse to said edges, make essentially point contact with one another at the second side of said members with said edges tapering away from each other in the direction toward said first side of said members.

11. A method according to claim 1, wherein said members are moved relative to a guide apparatus to position the respective edges of said members in said abutting contact.

12. A method according to claim 1, wherein said step of positioning the respective edges of said members in abutting contact includes clamping said members in a welding jig with clamping means.

13. A method according to claim 1, wherein said members are formed of sheet material.

14. A method of forming a laser butt weld comprising the steps of providing two members to be butt welded, positioning respective longitudinally extending edges of said members to be butt welded in abutting contact with the two members being canted slightly with respect to one another so that the butt joint formed by said abutting edges is open toward a first side of said members in a direction transverse to the direction in which said edges longitudinally extend and with said abutting edges of said butt joint contacting one another toward a second side of said members opposite said first side, directing at least one high energy density laser beam at said butt joint while moving at least one of said laser beam and said members relative to the other in a direction along said butt joint for progressively butt welding said members, said laser beam being directed at said joint from said first side of said members in a direction transverse to the direction in which said edges longitudinally extend so that at least a portion of said laser beam extends into the open side of said butt joint and penetrates completely through said butt joint to form a keyhole therethrough with molten material of said members surrounding said keyhole, and urging said two members in the direction of said butt joint during said welding so that the molten edges of said members are mashed together immediately behind the keyhole as said keyhole and laser beam are moved relative to said members in a direction along said butt joint.

15. A method according to claim 14, wherein said members are moved relative to a guide apparatus to position the respective edges of said members in said abutting contact.

16. A method according to claim 15, wherein said two members are the opposite sides of a single piece of material which is formed into a tubular-shaped workpiece having opposed longitudinally extending edges to be butt welded.

17. A method according to claim 16, wherein said tubular-shaped workpiece is supported by support means as it is moved relative to said guide apparatus, the location of said support means being adjusted with respect to said guide apparatus to effect said slight canting of the opposed sides of the workpiece with respect to one another.

18. A method according to claim 17, wherein the tubular-shaped workpiece is generally cylindrical in cross section, said workpiece being supported by said support means relative to said guide apparatus such that the workpiece has a slightly pear-shaped cross section with said edges being at the top thereof to thereby cant the opposed sides of the workpiece with respect to one another and open said joint on the outer side of said workpiece.

19. A method of forming a butt weld comprising the steps of providing two members to be butt welded, positioning respective longitudinally extending edges of said members to be butt welded in abutting contact with the edges being canted slightly with respect to one another so that the butt joint formed by said abutting edges is open toward a first side of said members in a direction transverse to the direction in which said edges longitudinally extend with said abutting edges of said butt joint contacting one another toward a second side of said members opposite said first side, and directing at least one high energy density beam at said butt joint, said beam being directed at said butt joint from said first side of said members in a direction transverse to the direction in which said edges longitudinally extend so that at least a portion of said beam extends into the open side of said butt joint to said edges for butt welding said members.

20. A method according to claim 19, wherein said high energy density beam is a laser beam.

* * * * *